United States Patent [19]
Tabuchi et al.

[11] Patent Number: 5,941,357
[45] Date of Patent: Aug. 24, 1999

[54] ELECTROMAGNETIC CLUTCH

[75] Inventors: Yasuo Tabuchi, Toyoake; Masashi Tobayama, Chiryu, both of Japan

[73] Assignee: Denso Corporation, Kariya, Japan

[21] Appl. No.: 08/927,042

[22] Filed: Sep. 10, 1997

[30] Foreign Application Priority Data

Sep. 12, 1996 [JP] Japan .................................. 8-242182

[51] Int. Cl.⁶ ................................................ F16D 27/112
[52] U.S. Cl. ....................................................... 192/84.961
[58] Field of Search ........................... 192/84.961, 82 T, 192/150; 310/68 C; 335/217

[56] References Cited

U.S. PATENT DOCUMENTS

| | | | |
|---|---|---|---|
| 4,799,578 | 1/1989 | Matsushita | 192/84.961 |
| 4,896,756 | 1/1990 | Matsuhita | 192/84.961 |
| 5,687,823 | 11/1997 | Nakagawa et al. | 192/84.961 |

*Primary Examiner*—Rodney H. Bonck
*Attorney, Agent, or Firm*—Pillsbury Madison & Sutro LLP

[57] ABSTRACT

An electromagnetic clutch for a compressor in an air conditioning system, having a rotor 2 for receiving a rotating movement from its source, a hub 12 in connection with a rotating shaft of the compressor, a coil housing 4 for storing a coil spool 14 on which an electromagnetic coil is wound, and an armature 8 which is attracted to a frictional surface 2a of the rotor 2 under the effect of an electromagnetic attracting force generated by the electromagnetic coil 5. The coil spool 14 has an inclined surface at an inner corner location which is located adjacent the frictional surface 2a of the rotor 2. The coil spool has a recess at a location where the inclined surface is formed, in which recess a temperature fuse is arranged. The temperature fuse is broken under a condition that the temperature is higher than a predetermined value, thereby de-energizing the electromagnetic coil 5.

9 Claims, 11 Drawing Sheets

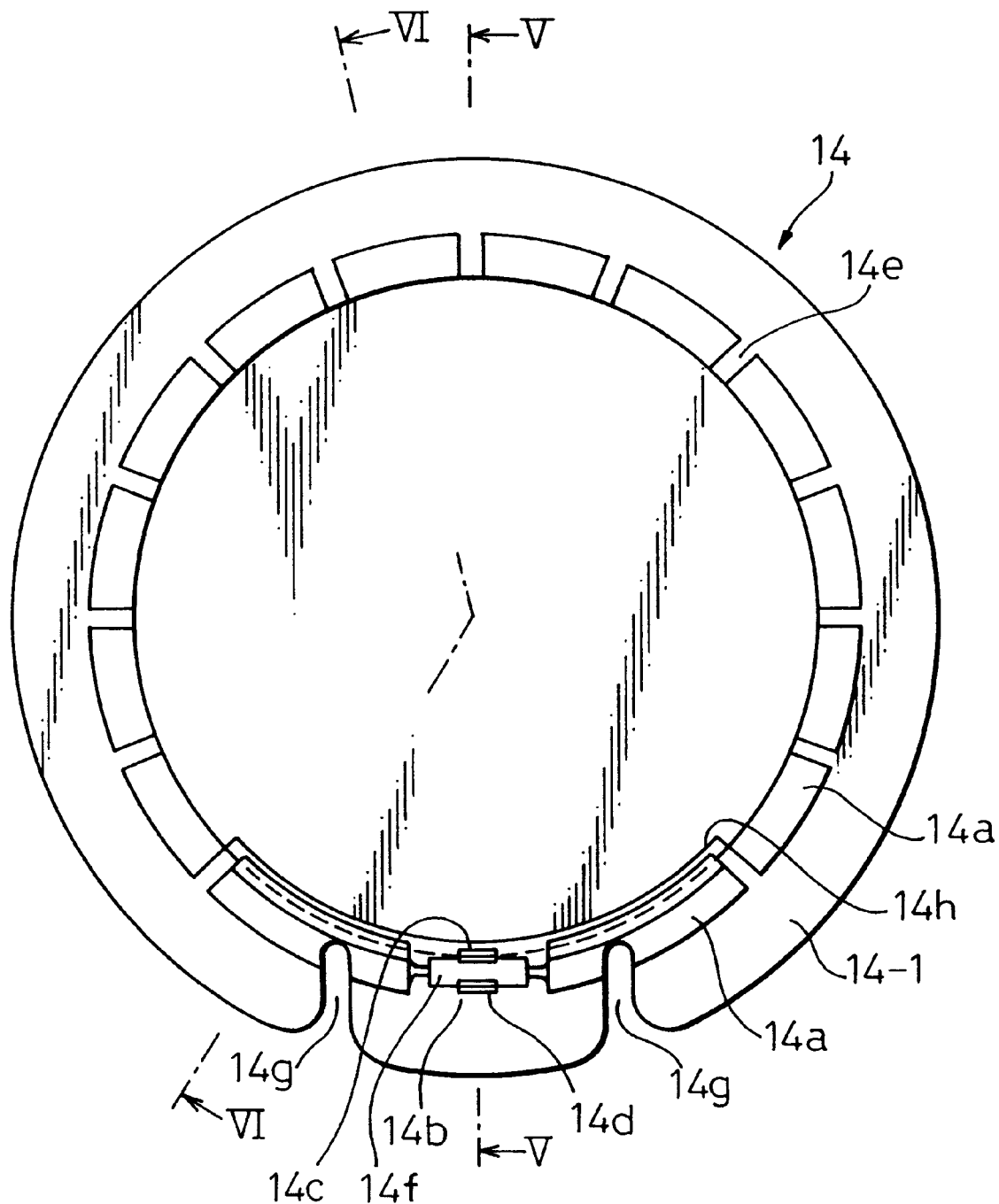

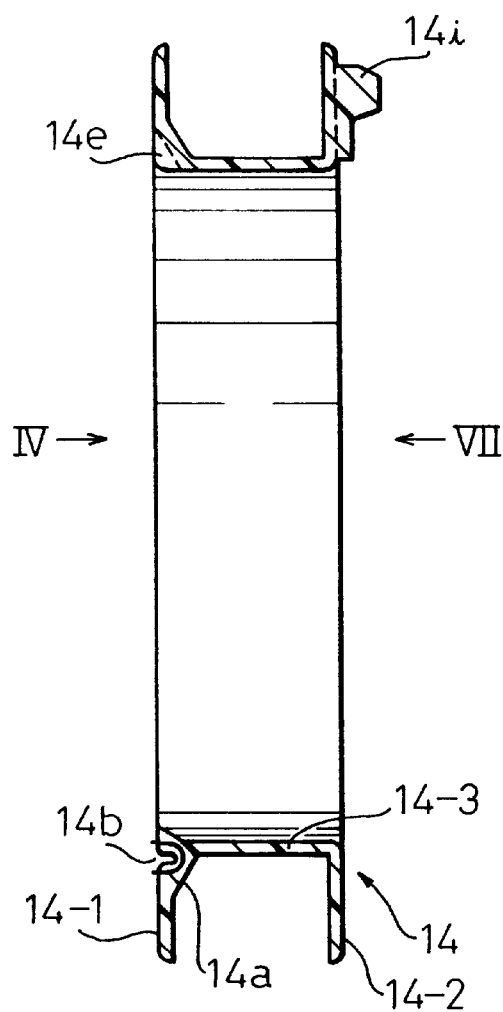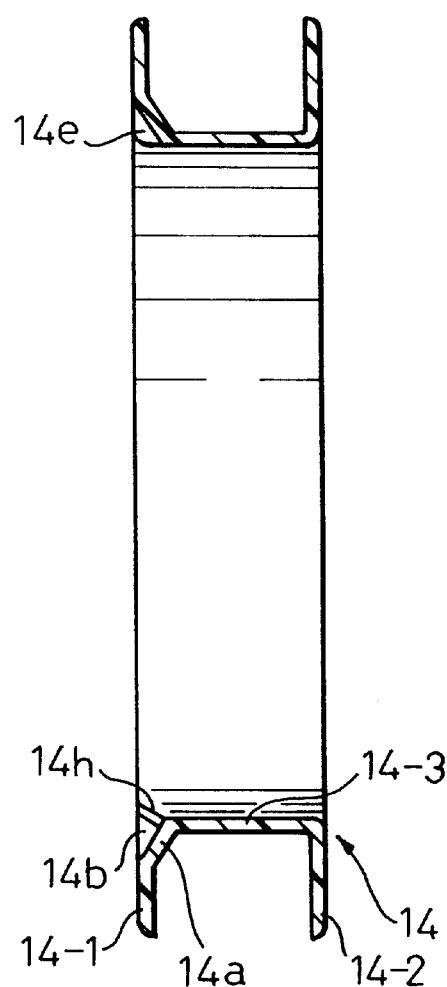

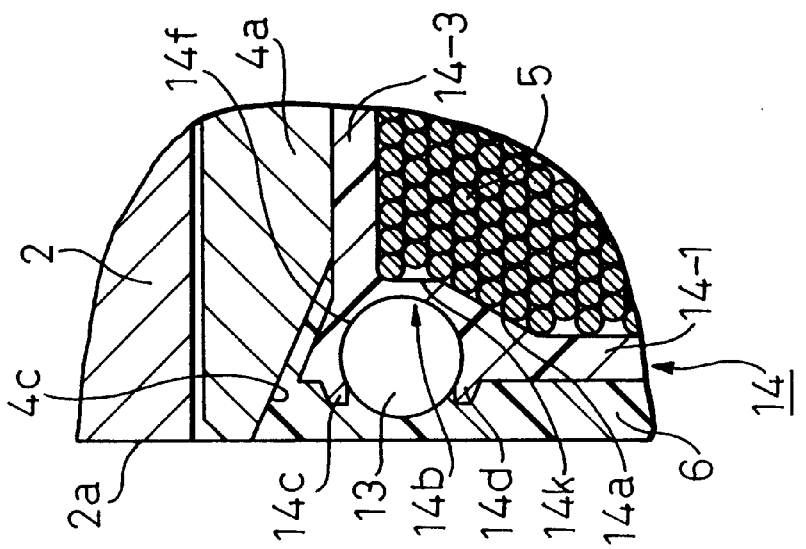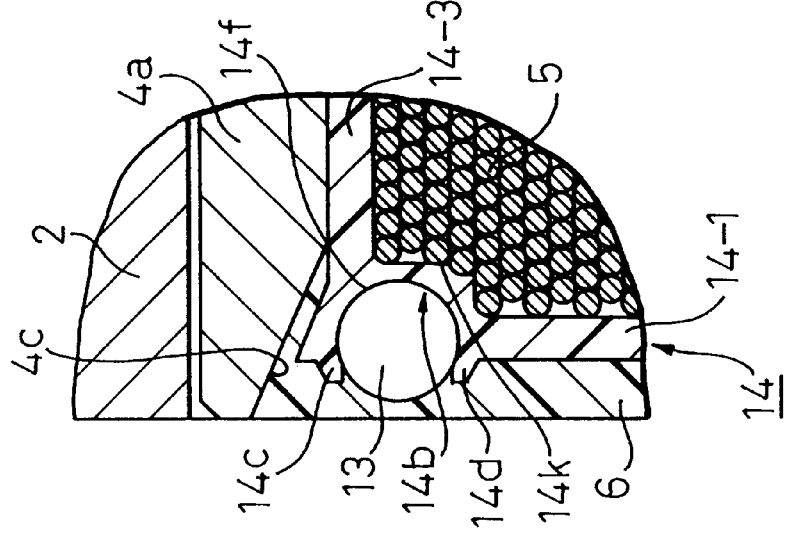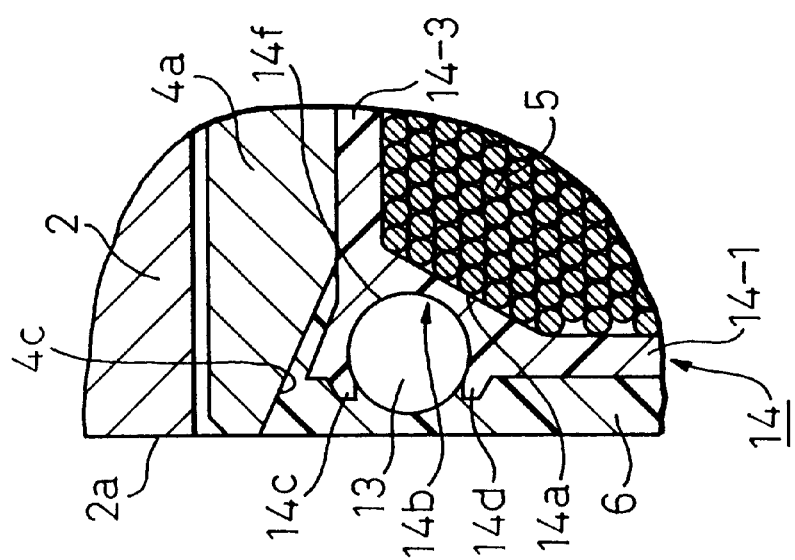

ELECTROMAGNETIC CLUTCH

BACKGROUND OF THE INVENTION

1. Field of the Invention

The present invention relates to an electromagnetic clutch, for selective transmission of driving power, which is suitably used for operating a compressor in a refrigerating system for an air conditioning apparatus for an automobile.

2. Description of Related Art

In an air conditioning apparatus for an automobile having an internal combustion engine, an electromagnetic clutch is provided for kinematic connection of a compressor in a refrigerating system with a crankshaft of the internal combustion engine via a pulley-belt power transmission mechanism, so that the rotating movement of the crankshaft of the internal combustion engine is selectively transmitted to the compressor. A belt in the pulley-belt power transmission mechanism is also used for transmitting the rotating movement of the engine to other various engine supplementing devices, such a water pump for recirculating engine cooling water and a generator for charging batteries.

In the operation of the air conditioning apparatus, an occurrence of a seizing in the compressor causes its rotating shaft to be locked, which can cause an excessive force to be generated in a belt for a kinematic connection of the crankshaft with the compressor, resulting in a damage in the belt. Such a damage of the belt causes the various engine supplementing units, such as an water pump and a generator, to be stopped, thereby causing the engine to be stopped. Thus, a solution is essential in order to prevent such a situation from being occurred.

In a prior art, in an electromagnetic clutch having a rotor for receiving a rotating movement from the internal combustion engine and an armature which is, due to an electromagnetic force of an electromagnetic coil, attracted to the rotor, causing the armature to be rotated by the rotating movement of the rotor, Japanese Unexamined Patent Publication No. 57-51025 proposes a method for de-energizing the electromagnetic clutch in case of an occurrence of locking. Namely, an occurrence of locking causes the armature to be prevented from being rotated and the rotor to continue its rotating movement while sliding with respect to the armature. Such a sliding movement between the rotor and the armature causes the temperature to be abnormally increased at the point of contact. Thus, the use of a temperature fuse is proposed, which is fused by the above mentioned abnormally increased temperature at the location where a sliding contact occurs between the armature and the rotor. The fusing of the temperature fuse causes the electromagnetic coil of the clutch to be de-energized, so that the rotor is disengaged from the armature, thereby releasing the load in the belt. As a result, the belt is prevented from being subjected to an excessive force.

In the above mentioned Japanese Unexamined Patent Publication No. 57-51025 using a temperature fuse, a spool for holding the electromagnetic coil is fixedly connected to a coil housing, and the temperature fuse is arranged in the spool at a location facing an end surface of the rotor.

However, in the structure of the prior art, the temperature fuse is located on a radially extending side surface of the coil spool at a location intermediate between an outer peripheral portion and an inner peripheral portion. As a result, a reduction in the axial length of the coil spool is inevitable for a length which corresponds to the area occupied by the temperature fuse, resulting in a reduction in the number of turns of the electromagnetic coil. Thus, an increase in an electric power is essential in order to keep a desired value of an electromagnetic sucking force, thereby increasing an electric power consumption.

Furthermore, according to the test by the inventors of the present invention, the prior art also encounters a further problem in that heat at a location around the temperature fuse is emitted to the atmosphere less effectively due to the fact that the temperature fuse is, at a location spaced from the coil housing, covered by a resin member for thermal insulation of the electromagnetic coil and the coil spool. Due to the reduced efficiency in the heat emission, a generation of a heat in the electromagnetic coil during a normal operation of the compressor causes the temperature to be highly increased around the temperature fuse, thereby erroneously operating the temperature fuse. Furthermore, during a locked condition of the compressor, transmission of the increased temperature generated at the sliding contacting portion between the armature and the rotor is prevented due to the existence of the resin member. In other words, the transmission of the heat at the sliding portion is less effective, which causes the time to be increased until the fusing of the temperature fuse, resulting in a reduction in a response speed. The reduction in the response speed causes a seizing to occur, due to the temperature increase, at a bearing in the electromagnetic clutch prior to an occurrence of a fusing of the temperature fuse.

SUMMARY OF THE INVENTION

An object of the present invention is to provide an electromagnetic clutch capable of preventing the space for winding the electromagnetic coil from being reduced due to the provision of the temperature fuse.

Another object of the present invention is to provide an electromagnetic clutch capable of reducing the possibility of an erroneous operation of the temperature fuse, while keeping the response speed of the temperature fuse, to a temperature increase due to sliding in a clutch caused by an occurrence of a locking high.

According to the present invention, an electromagnetic clutch for selective connection of a rotating movement source with a rotary device is provided, said electromagnetic clutch comprising:

a first rotating member made of a magnetic substance and connected to said rotating movement source so that the first rotating member is rotated;

a second rotating member connected to said rotary device for transmission a rotating the rotating movement;

an electromagnetic coil for generating an electromagnetic attractive force when said electromagnetic coil is energized;

a coil housing made of a magnetic substance for storing therein with said electromagnetic coil;

an armature made of a magnetic substance;

said first rotating member forming a frictional engagement surface which is faced with the armature so that said electromagnetic attracting force of the electromagnetic coil causes the armature to be attracted to the frictional engaging surface of the first rotating member;

an elastic connection means arranged between said armature and the second rotating member for holding said armature at a location spaced from the frictional engaging surface of the first rotating member when said electromagnetic coil being de-energized;

a temperature fuse arranged in the coil housing at a location adjacent the frictional engaging surface of the first rotating member, said temperature fuse being fused at a temperature higher than a predetermined value, so that said electromagnetic coil is de-energized, and;

a coil spool of a tubular shape arranged in said coil housing, while said electromagnetic coil is located on the coil spool;

said coil spool containing, at a location adjacent the frictional surface of the first rotating member, a recess where said temperature fuse is arranged.

In this structure, temperature sensor is arranged in the recess in the coil spool. Thus, a reduction of the axial length of the coil spool due to the arrangement of the coil spool does not occur unlike the prior art where a temperature fuse is arranged on a radially extending surface of the coil spool at an intermediate portion between an inner and outer portions of the coil spool. Thus, according to the present invention, only a small reduction for a space for winding a coil occurs. As a result, a reduction in the number of turns of the coil held by the coil spool is highly suppressed compared to the structure of the prior art. Thus, an increase in an electric power consumption is reduced, while keeping the desired value of the electromagnetic attracting force from the electromagnetic coil.

Advantageously, said recess for storing the temperature fuse is located at an inner corner of the coil spool. In the structure of the electromagnetic clutch according to the present invention, a suppression of an erroneous operation of the temperature fuse as well as increase in the response speed, which are contradictory requirements, are also obtained. Namely, in a situation where heat is generated by the electromagnetic clutch during a normal operation of the driven device such as a compressor, the heat around the temperature fuse is emitted to the coil housing made of a magnetic material having an increased heat conductivity over a resin material due to the fact that the temperature fuse is located at the inner corner portion of the coil spool. As a result, the temperature around the temperature fuse is highly reduced over the situation that the temperature fuse is located in the middle of a resin material of reduced heat conductivity. Thus, it is less likely that the generation of the heat due to the operation of the electromagnetic clutch causes the temperature fuse to be erroneously operated (fused).

On the other hand, in a situation where locking is generated due to an occurrence of seizing at a driven side device, an abnormal temperature increase is obtained due to frictional heat at a sliding portion between the armature and the drive side rotating member (first rotating member). Such an abnormal increase in the temperature at the sliding portion causes the temperature to be quickly increased at an end of the first rotating member which is located adjacent the frictional surface of the first (drive sided) rotating member. The increased heat at the end of the first rotating member is instantly transmitted to the temperature fuse, which is located adjacent to the end. Thus, a quick increase in the temperature of the temperature fuse is obtained with respect to the increase in the temperature of the drive side rotating member due to the occurrence of the locking. Thus, even in a situation of an occurrence of a locking in a driven device, an increase of the temperature at the temperature fuse to the fusing temperature occurs very quickly, thereby de-energizing the electromagnetic coil of the electromagnetic clutch, thereby preventing the temperature in the bearing unit of the electromagnetic from being increased, prior to the fusing of the temperature fuse, which would otherwise cause the bearing unit to be locked as is the case in the prior art structure of the electromagnetic clutch.

Advantageously, said coil housing is formed as a double tube structure having an inner tubular and outer tubular portions, said inner tubular portion of the coil housing being, at a tip end adjacent the frictional surface of the first rotating member, formed with an inclined surface which is inclined from an outer side to an inner side, and wherein said recess for storage of the temperature fuse is arranged along said inclined surface of the inner tubular portion of the coil housing.

According to this structure, the arrangement of the recess along the inclined surface of the end of the inner tubular portion of the coil housing allows the area of the recess to be increased, thereby effectively suppressing a reduction of the turns of the electromagnetic clutch, thereby keeping a desired value of the electromagnetic force while suppressing an increase in an electric current applied to the electromagnetic coil.

DESCRIPTION OF ATTACHED DRAWINGS

FIG. 4 is a front elevational view of a coil spool and is a view taken alone an arrow IV in FIG. 5.

FIG. 5 is a cross sectional view taken along a line V—V in FIG. 4.

FIG. 6 is a cross sectional view taken along a line VI—VI in FIG. 4.

FIG. 8 is a partial enlarged view of the coil spool in FIG. 1 at a location where a temperature fuse is arranged.

FIG. 9 is similar to FIG. 8 but illustrates a different embodiment of the present invention.

FIG. 10 is also similar to FIG. 8 but illustrates a further embodiment of the present invention.

DESCRIPTION OF PREFERRED EMBODIMENTS

Now, embodiments of the present invention will be described with reference to the attached drawings.

Figure 1:
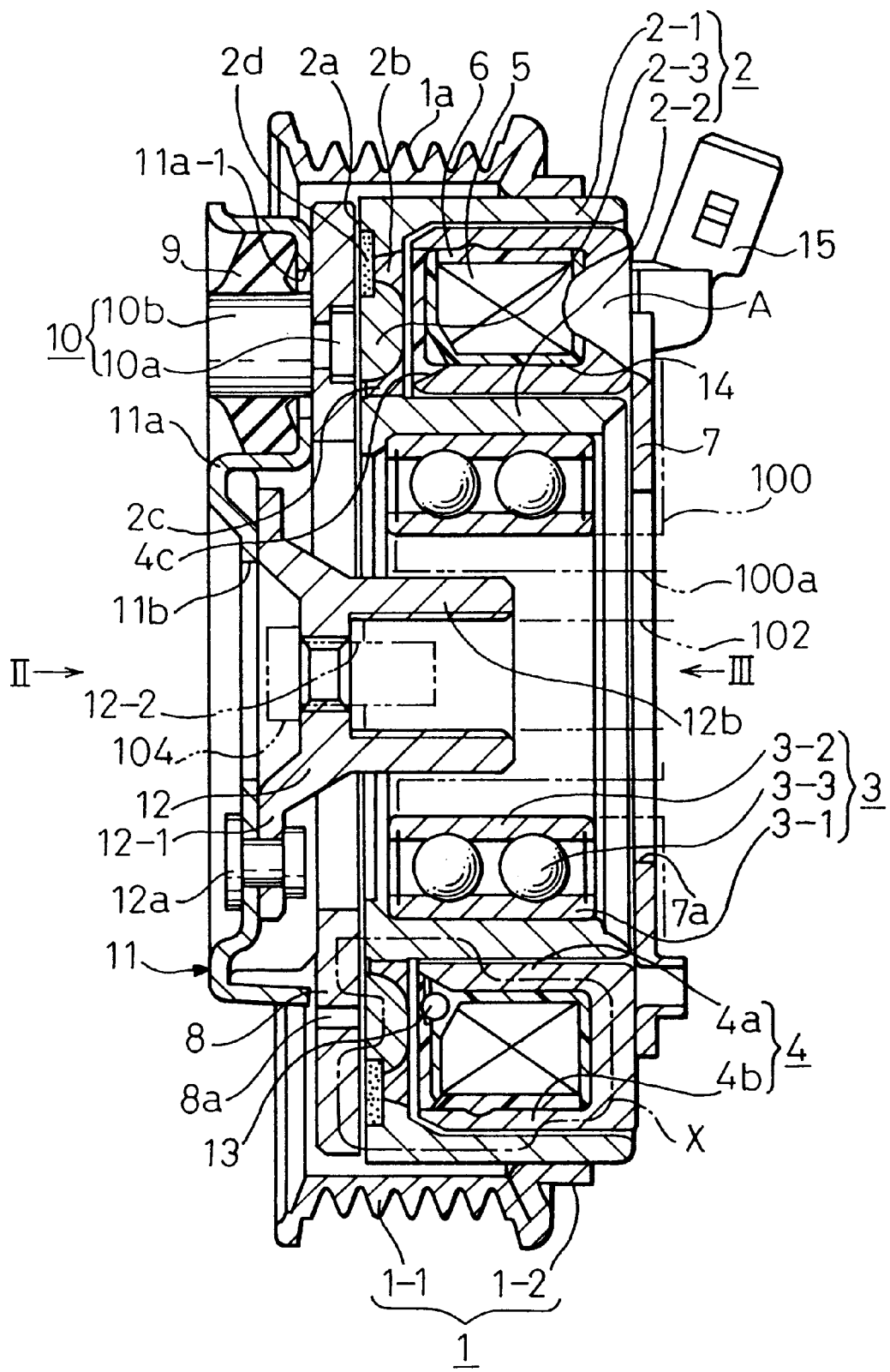
FIG. 1 is a longitudinal cross sectional view of the electromagnetic clutch according to the first embodiment of the present invention, taken along a line I—I in FIG. 2.
Figure 2:
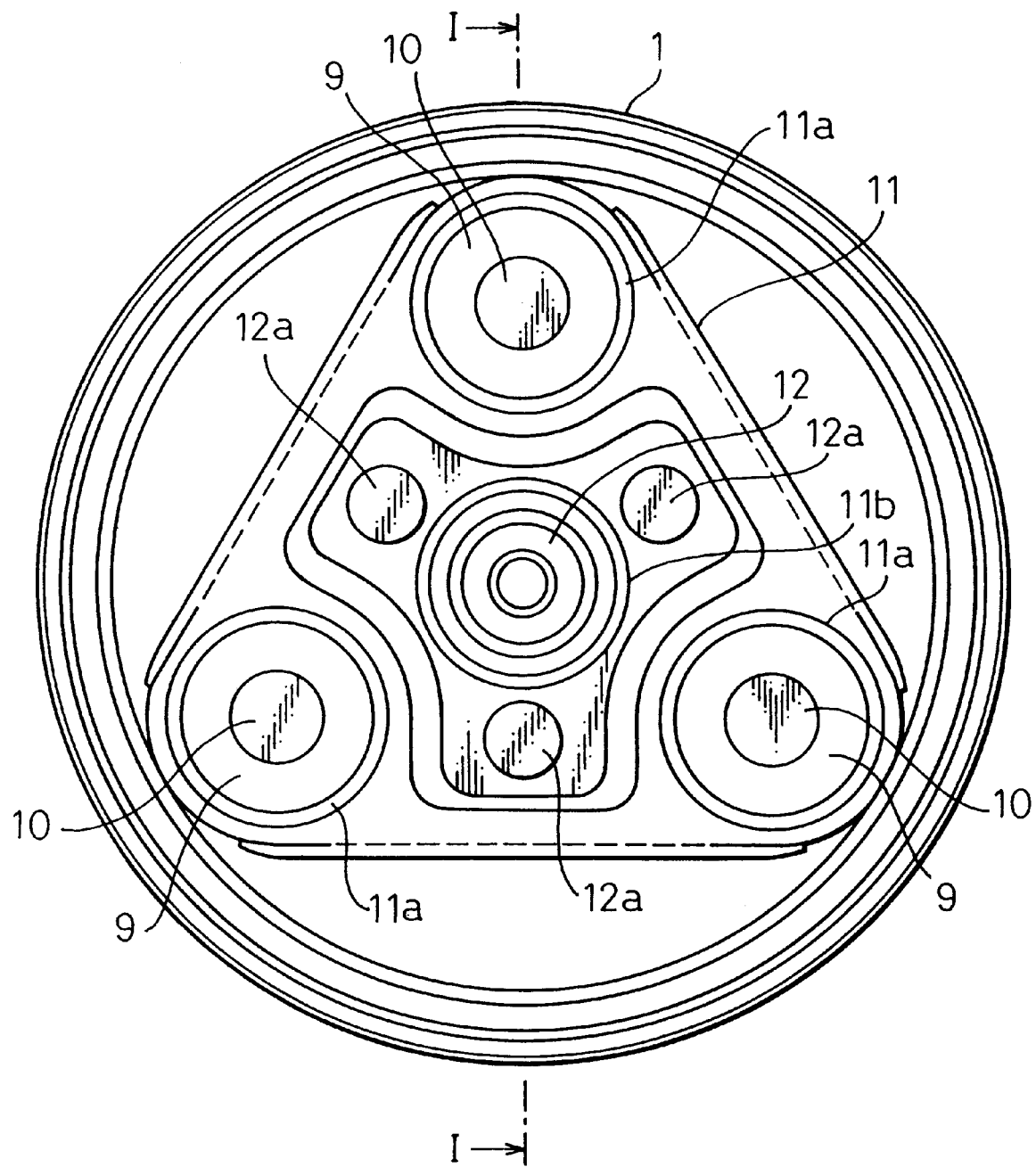
FIG. 2 is a front elevational view of the electromagnetic clutch taken along an arrow II in FIG. 1.

In FIGS. 1 and 2, a reference numeral 1 denotes a drive pulley which is, via a not shown belt, in a driving connection with a pulley (not shown) on a crankshaft (not shown) of an internal combustion engine, so that a rotating movement of the crankshaft is transmitted to the pulley 1. The pulley 1 is made of a steel based metal and is constructed by a pulley part 1-1 and a support part 1-2. The pulley part 1-1 is formed with a plurality of V-shaped grooves 1a, which are engaged by the belts (not shown) of V cross-sectional shape.

A reference numeral 2 denotes a driving rotor of a substantially C cross sectional shape, which is made of a steel based material (ferromagnetic substance). The rotor 2 is constructed by an outer tubular portion 2-1, an inner tubular portion 2-2 and a disk portion 2-3 which integrally connects the portions 2-1 and 2-2 with each other. The outer tubular portion 2-1 is fixedly connected to the support part 1-2 of the pulley 1 by a suitable means such as a welding.

Arranged inside of the rotor 2 is a bearing unit 3, which is constructed by an outer race 3-1, an inner race 3-2 and axially spaced rows of balls 3. The outer race 3-2 of the bearing unit is fitted to the inner tubular portion 2-2 of the rotor 2, while the inner race 3-2 of the bearing 3 is fitted to a tubular boss portion 100a of a front housing 100 of the compressor. This compressor 100 is used for a refrigerating system for an air conditioning apparatus for an automobile.

A reference numeral 4 denotes a coil housing which functions as a stationary magnetic pole member. The coil housing 4 is made of a steel based material (ferromagnetic substance) and is formed as a C-cross sectional shape constructed by an inner tubular portion 4a and an outer tubular portion 4b. Arranged on the inner tubular portion 4a of the coil housing 4 is a coil spool 14 made of a resin material and of a tubular ring shape with axially spaced flanges. An electromagnetic coil 5 is wound on the spool 14 and is fixedly held thereto. The electromagnetic coil 5 and the coil spool 14 are held by the coil housing 4, while a resin member 6 is filled in a gap between the parts 4, 5 and 14, so that the electromagnetic coil 5 is electrically insulated from the housing 4.

As for the resin member 6, a resin material is employed which is capable of molding at a relatively low temperature in a range between 130 to 140° C., such as epoxy or unsaturated polyester. Namely, the resin 6 is injected into a space in the coil housing 4, while the spool 14 with the coil 5 are held inplace in the housing 4. Furthermore, as for a material forming the coil spool 14, a resin having not only a resistance to a heat as generated by the electromagnetic coil 5 but also a rigidity of a desired extent, such as a nylon or polyphenylene sulfide or polybutylene terephthalate. Any of these resins has a thermal deformation temperature as high as 200° C. or higher which is sufficiently higher than a molding temperature of the resin member 6 which is in a range between 130 to 140° C. As a result, the injection of the filler 6 does not cause the spool 14 to be thermally degraded.

The coil housing 4 is arranged in the annular space of the C-cross sectional shape of the rotor 2 at a small clearance, which allows the rotor 2 to be rotatable with respect to the coil housing 4. At a rear side of the coil housing 4, a stay member 7 of a substantially rectangular shape made of a steel based material is connected by a suitable means such as spot welding. The stay member 7 is formed with a central opening 7a, through which the boss portion 100a of the housing 100 is extended. Furthermore, the stay member 7 is fixedly connected to the housing 100 by a suitable means such as welding.

The disk portion 2-3 of the rotor 2 is formed with a friction surface 2a extending transverse to the rotating axis of the rotor 2. In the disk portion 2-3 of the rotor 3, ring shaped magnetic field insulating members 2b and 2c, which are radially spaced, are integrated. The disk portion 2-3 of the rotor 2 is, at the friction surface 2a, formed with an annular recess opened to the insulating member 2b, to which recess a friction member 2d of a ring shape is arranged, which is for increasing a frictional force, thereby increasing a transmission torque.

Arranged axially faced with the rotor 2 is an armature 8, of a ring shape, made of a steel based material (ferromagnetic substance). As will be fully described later, the armature 8 is, by means of resilient members 9 made of a rubber material, connected to a holder 11 connected to a hub 12. The resilient force of the rubber members 9 causes the armature 8 to be, with a predetermined gap, detached from the frictional surface 2a of the rotor 2 in a de-energized condition of the electromagnetic coil 5. In a well known manner, the armature 8 is formed with circumferentially extending and angularly spaced grooves 8a of an arc shape for executing a magnetic shield operation.

An energization of the electromagnetic coil 5 causes a closed circuit magnetic flux to be created through the rotor 2, the coil housing 4 and the armature 8 as shown by an alternate long and short dashed line X in FIG. 1. Such a closed circuit of magnetic flux causes, against the spring force of the rubber members 9, the armature 8 to be moved toward the rotor 2 so the armature 8 is axially contacted with the frictional surface 2a of the rotor 2, thereby allowing a rotating movement from the rotor 2 to be transmitted to the armature 8.

Rivets 10 are provided for connection of the armature 8 to the holder member 11 via the rubber members 9 as shown in FIG. 2. Namely, three of the rivets 10 are arranged at an angular distance of 120° C. As shown in FIG. 1, each of the rivets 10 is has a stub end 10a of a reduced diameter passed through the armature 8 and is crimped so that the rivet 10 is connected to the armature 8 and a support portion 10b of an increased diameter which is fixedly connected to the corresponding rubber member 9 by a suitable means such as adhesive material.

The holder member 11 is made of a steel based material and is substantially formed as a regular triangular shape as shown in FIG. 2. At the apex of the triangle, the holder member 11 is integrally formed with holder portions 11a of a tubular shape projecting axially toward the armature 8, while openings 11a-1 are formed at bottom of the tubular portions 11a, respectively, into which openings 11a-1 the support portions 10b of the respective rivet members 10 are freely inserted and the rubber members 9 are fitted to the respective tubular holder portions 11a. Furthermore, the holder member 11 is formed with a central opening 11b having an inner peripheral edge, along which a flange portion 12-1 of the hub 12 is fixed to the holder member 11 by means of three of the rivet members 12a, which are spaced at an interval of 120 degree and suitably crimped.

The hub 12 is made of a steel based material and has a boss portion 12b which extends axially so that the boss portion 12b is located in the boss portion 100a of the front housing 100 of the compressor. The compressor is provided with a rotating shaft 102 which has an end which is in a spline engagement with the boss portion 12b of the hub 12. Furthermore, a bolt 104 is inserted to the hub 12 via an opening 12-2 so that the bolt 104 is screwed to the end of the rotating shaft 102 of the compressor, so that the hub 12 is fixedly connected to the shaft 102, so that the rotating movement of the hub 12 is transmitted to the shaft 102.

The elastic member 9 is preferably made of a rubber material, which provides an increased torque transmission capacity of torque as well as an increased absorbing capacity of torque variation in a range of atmospheric air temperature between −30 to 115° C., which is suitable for an automobile, such as butyl rubber, acrylonitrile butadiene rubber, or ethylene propylene rubber.

In FIG. 1, reference numeral 13 denotes a temperature fuse unit, which includes a resin member (not shown), as a temperature sensitive member, made of an organic material which is fused at a predetermined temperature such as 184° C. In a well known manner, the temperature fuse unit 13 includes a pair of contacts (not shown) and a spring (not shown). Prior to a fusing of the temperature sensitive member, a closed electrical circuit between the contacts is created. Due to a fusing of the temperature sensitive member, the force of the spring causes the contacts to be seperated from each other, so that the electrical circuit is opened. The temperature fuse unit 13 is formed with an outer housing of a substantially tubular shape, in which these parts, i.e. are the temperature sensing member, the contacts and the spring, are housed. Furthermore, an occurrence of locking causes the armature to be prevented from being rotated. Thus, sliding occurs between the rotor and the armature, thereby generating an abnormally increased temperature at the sliding portion. Such an abnormally increase in the temperature at the sliding portion is detected by the temperature sensing member, which causes the member to be fused.

In view of the above, it is required that the temperature fuse 13 can quickly respond to the abnormally increased temperature caused by the sliding contact of the rotor with respect to the armature in the occurrence of the locking of the compressor. A setting of a location of the temperature fuse 13 according to the present invention will now be explained by reference to FIGS. 4 to 8.

Figure 11:
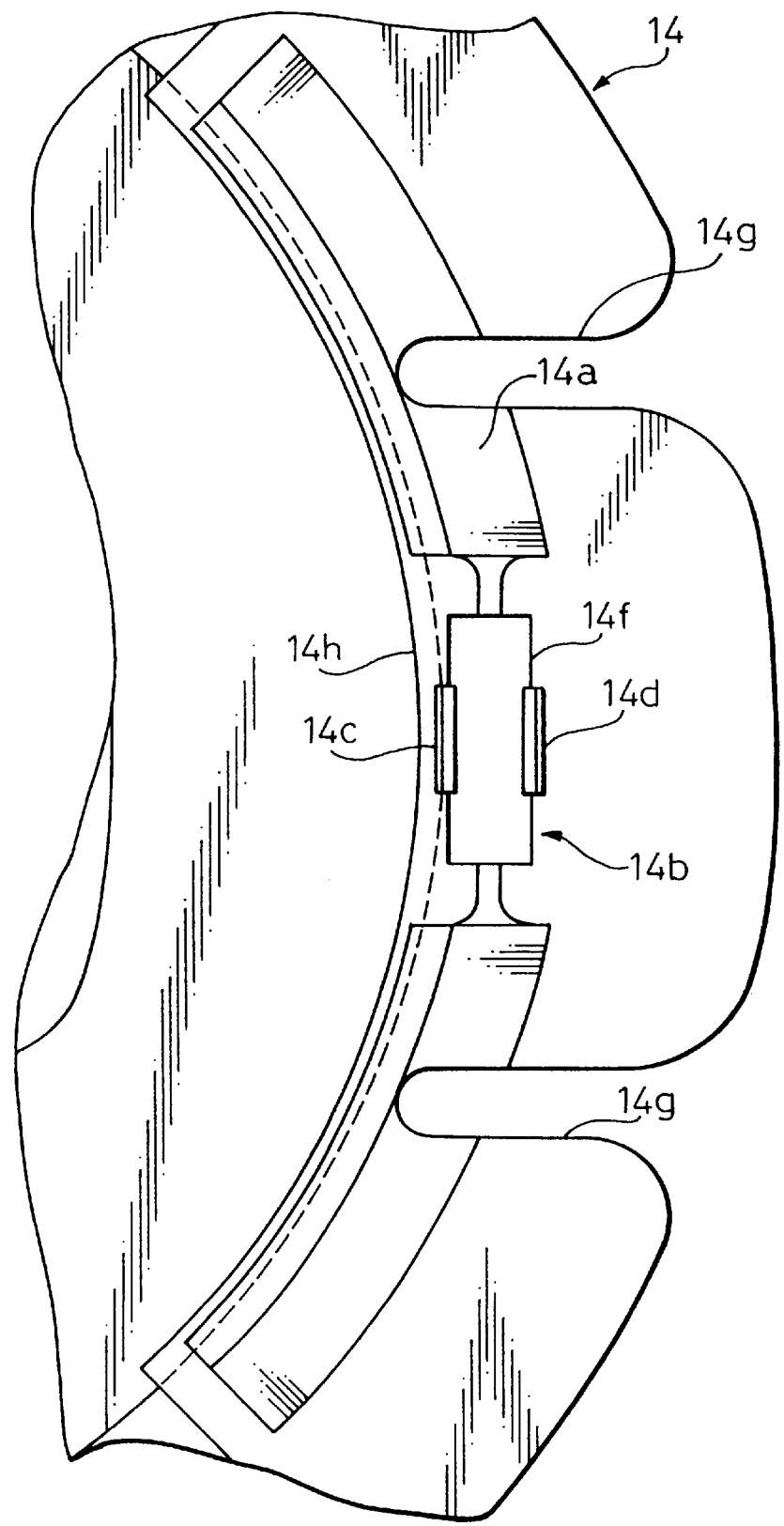
FIG. 11 is an enlarged view of a portion of the coil spool in FIG. 1 for holding a temperature fuse while the latter is not yet prepared.
Figure 12:
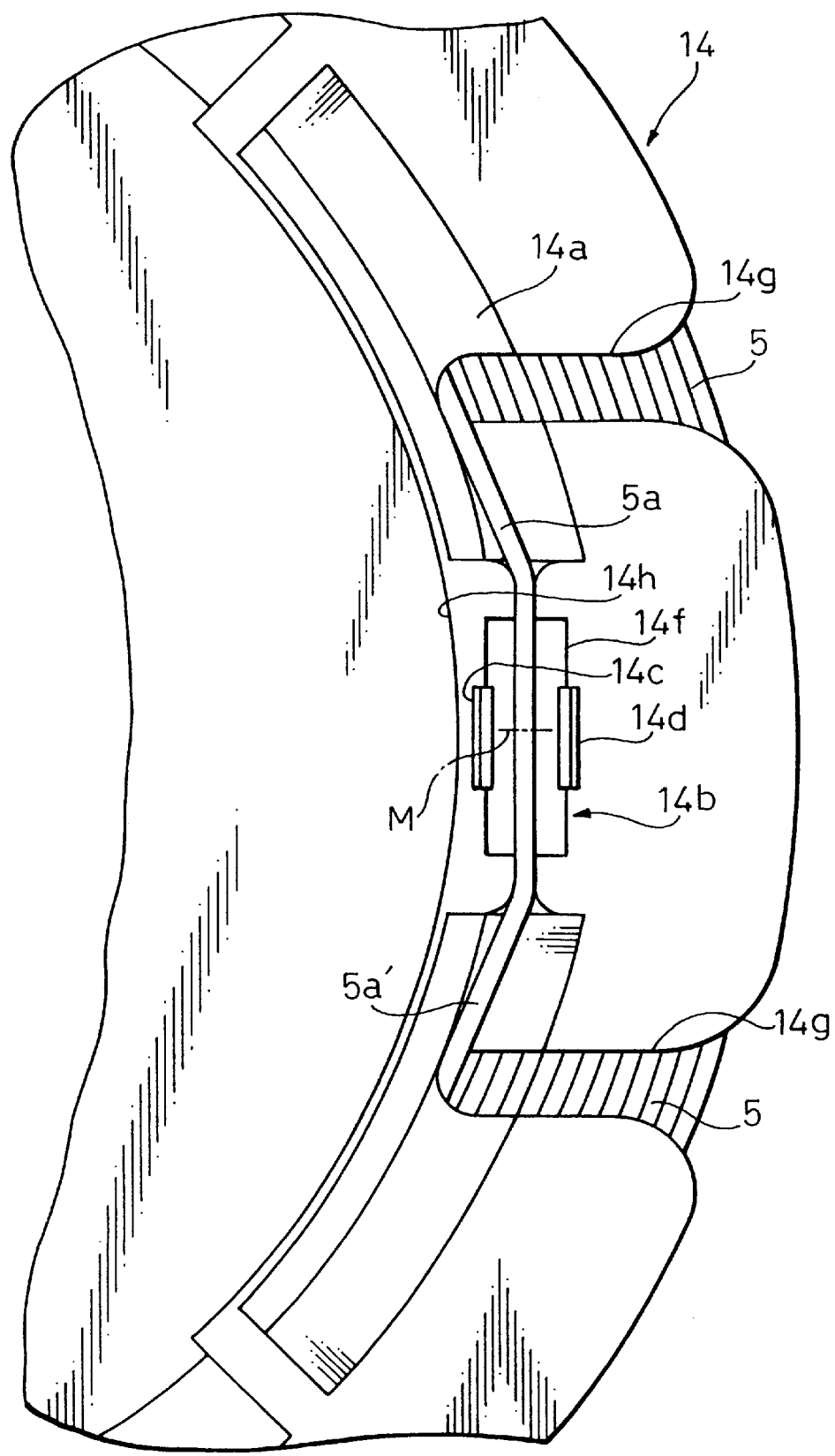
FIG. 12 is similar to FIG. 11 but the winding of an electromagnetic coil is completed.
Figure 13:
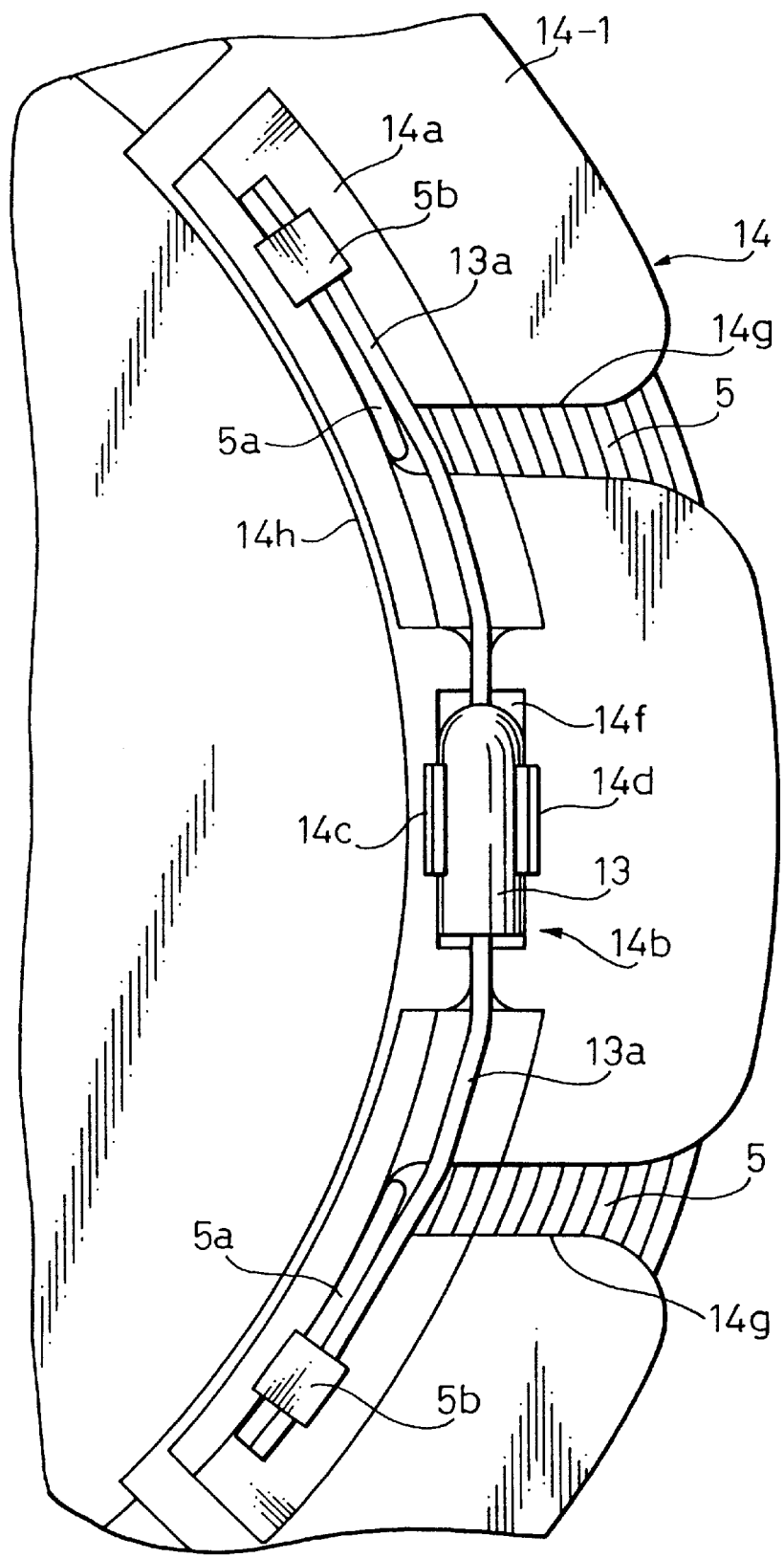
FIG. 13 is similar to FIG. 11 but the temperature fuse is mounted to the coil spool.

FIGS. 4 to 7 show a shape of the coil spool 14, while FIGS. 11 to 13 shows in detail a location in the coil spool 14 where the temperature fuse 13 is housed. As shown in FIGS. 5 and 6, the spool 14 is constructed by a pair of axially spaced apart flanges 14-1 and 14-2 and a tubular part 14-3 between the flanges 14-1 and 14-2. The flange 14-1 is the one which is located adjacent the frictional surface 2a of the rotor in FIG. 1. As shown in FIGS. 5 and 6, the flange 14-1 is, along the entire circumference, connected to the tubular part 14-3 via an annular tapered portion 14a. In other words, in the axial cross section, at a corner where the flange 14-1 is connected to the tubular portion 14-3, the portion 14a is inclined in the direction away from the frictional surface 2a of the rotor (FIG. 1). As a result, at an inner side of the tapered portion 14a, an annular recess 14b is formed at a location along the circumference, and the temperature fuse 13 is arranged in a location in the annular recess 14b.

It should be noted that the tapered surface 14a is interrupted at circumferentially spaced locations, where strengthening ribs 14e, which extend axially, are formed as shown in FIGS. 4 to 6.

As shown in FIGS. 1 and 8, the inner tubular portion 4a of the coil housing 4 is, at its tip end adjacent the friction surface 2a of the rotor 2, an annular tapered surface 4c. In other words, the thickness of the inner tubular portion 4a of the coil housing 4 is reduced at the tapered portion over the rest portion. In the closed circuit of the magnetic flux between the coil 5 and the armature 8 as shown by the dotted line X in FIGS. 1, the tapered surface 4c serves to prevent the magnetic flux from being directly directed to a radially central part of the frictional surface 2a of the rotor 2, i.e., serves to direct the magnetic flux toward radially inner part of the rotor 2. Furthermore, the annular tapered surface 4c also serves to increase the size of a recess 14 which is adapted for receiving the temperature fuse 13.

As shown in FIGS. 4 and 5, at a location along the circumference, the coil spool 14 is integrally formed with a pair of radially spaced and horizontally extending finger portions 14c and 14d, between which the temperature fuse 13 is resiliently held. As shown in FIG. 8, at an outer surface of the tapered portion 14a, the coil spool 14 is formed with an inner cylindrical surface 14f which has a shape which is complimentary with respect to the shape of an outer cylindrical surface of the temperature tube 13.

As shown in FIG. 4 (see also FIGS. 11 to 13), at the front flange portion 14-1, a pair of cut-out portions 14g are formed, which allow ends 5a and 5b of wires from the electromagnetic coil 5 to be taken out. As shown in FIG. 13, the ends 5a and 5b of the coil 50 are electrically connected to lead wires 13a from the temperature fuse 13 at connecting portions 5b. The electrical connection between the coil wire 5a and the lead wires 13a at the connecting part 5b is done by a suitable means such as soldering, fusing or crimping. In the shown embodiment in FIG. 13, the connection as the connecting portions 5b is done by crimping suitable crimping members made of a certain metal material.

As shown in FIGS. 4, 6 and 11 to 13, along an angular range of an inner circumference of the coil spool 14, where the wire 5a of the electromagnetic coil 5 and the lead wires 13a of the temperature fuse 13 are arranged, the coil spool 14 is formed with a projection 14h which is obliquely and inwardly projected. The projection 14h serves to electrically separate the wound portion of the electromagnetic coil 5 in the coil spool 14 from the wire portions 5a and the lead wires 13a.

Figure 7:
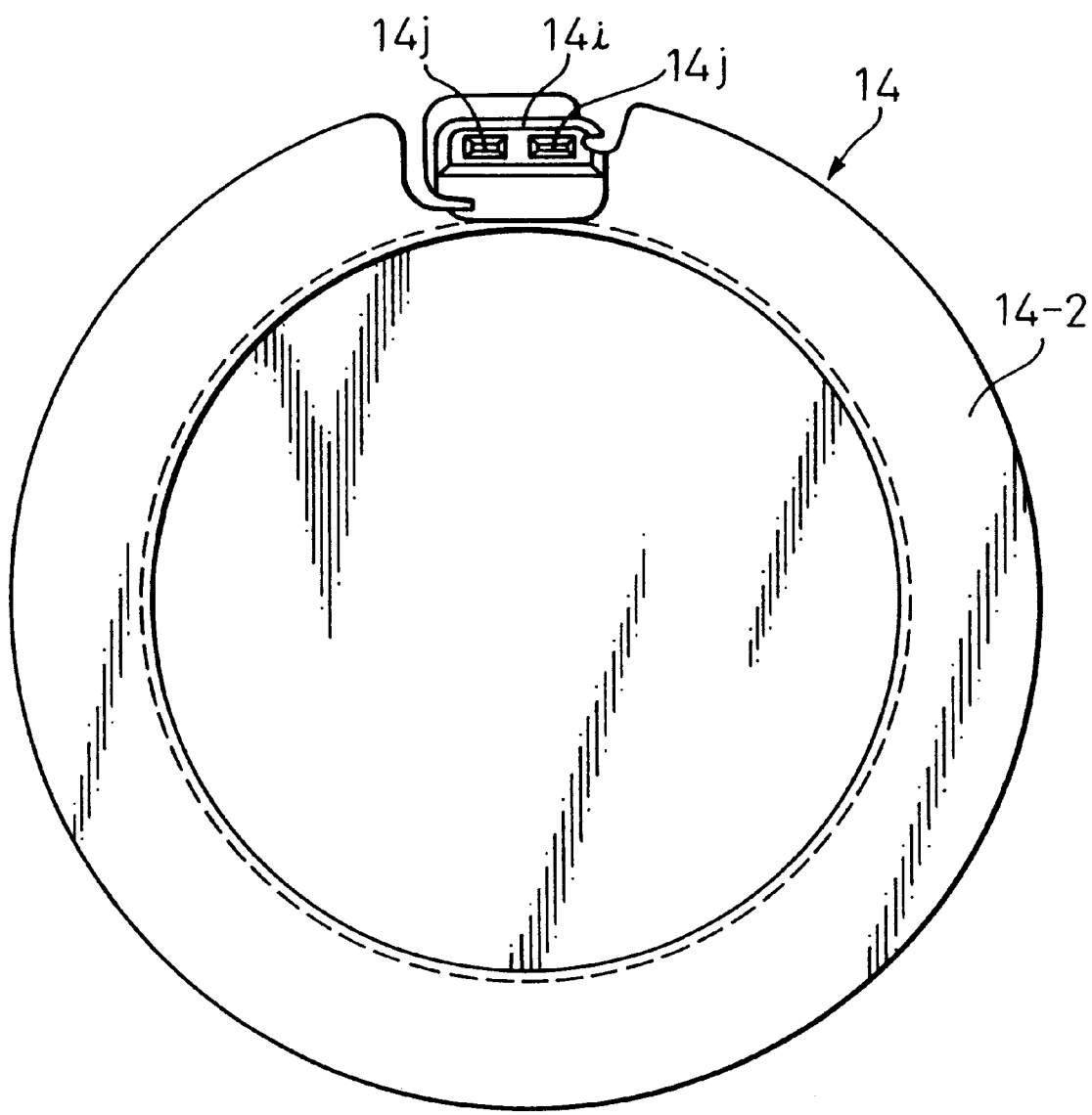
FIG. 7 is a rear elevational view of the coil spool and is a view taken along an arrow VII in FIG. 5.

As shown in FIGS. 5 and 7, on the rear flange part 14-2, the coil spool 14 is integrally formed with an outlet portion 14i for taking out a starting end and a finishing end of the electromagnetic coil 5. The portion 14i is arranged on a location of the coil spool 14 opposite the frictional surface 2a of the rotor 2 and 180 degrees away from the location where the temperature fuse 13 is arranged. The coil outlet taking out portion 14i is formed with a pair of openings 14j for taking-out the ends 5c and 5d of the electromagnetic coil 5, respectively.

Figure 3:
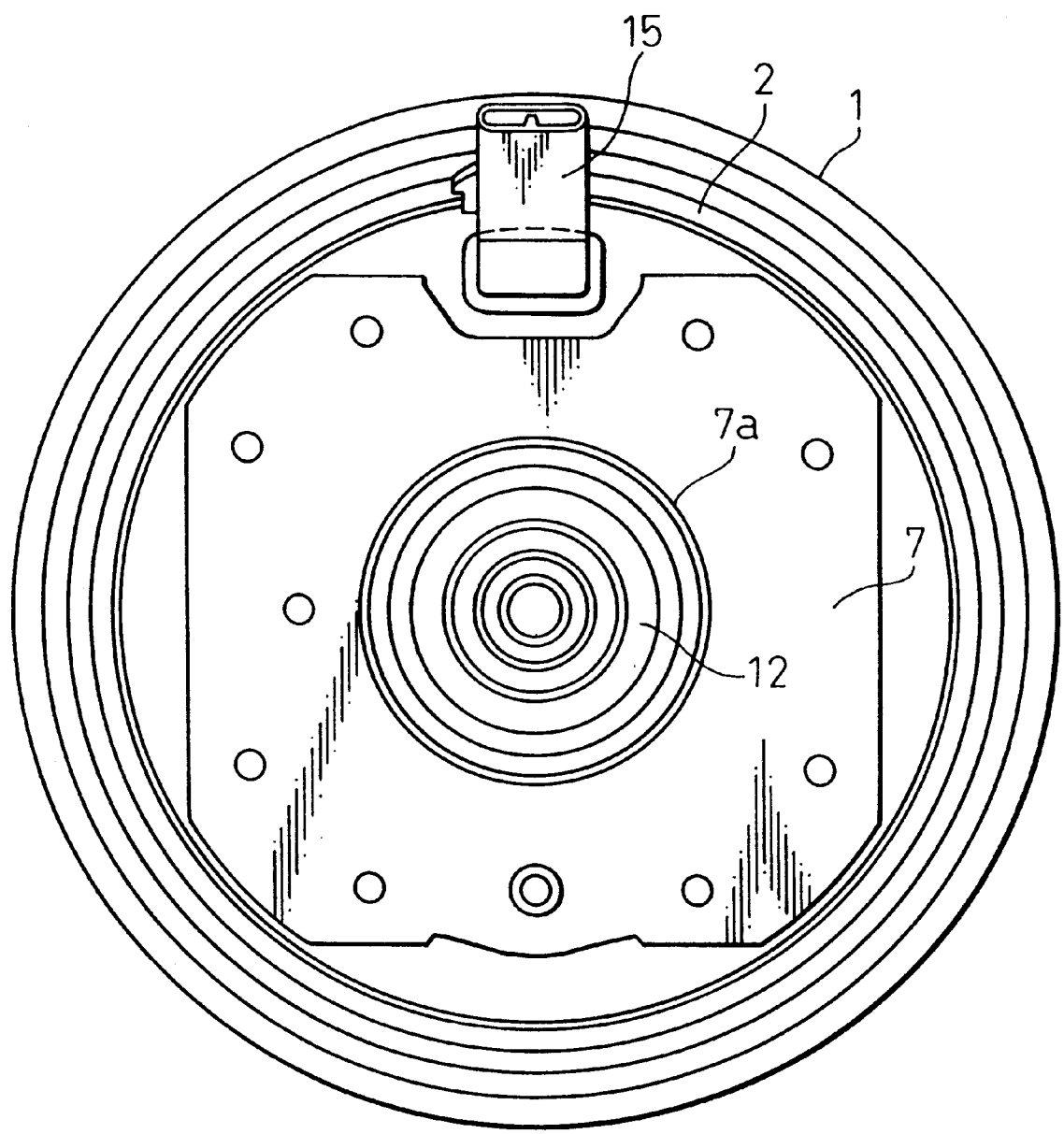
FIG. 3 is a rear elevational view of the electromagnetic clutch taken along an arrow III in FIG. 1.
Figure 14:
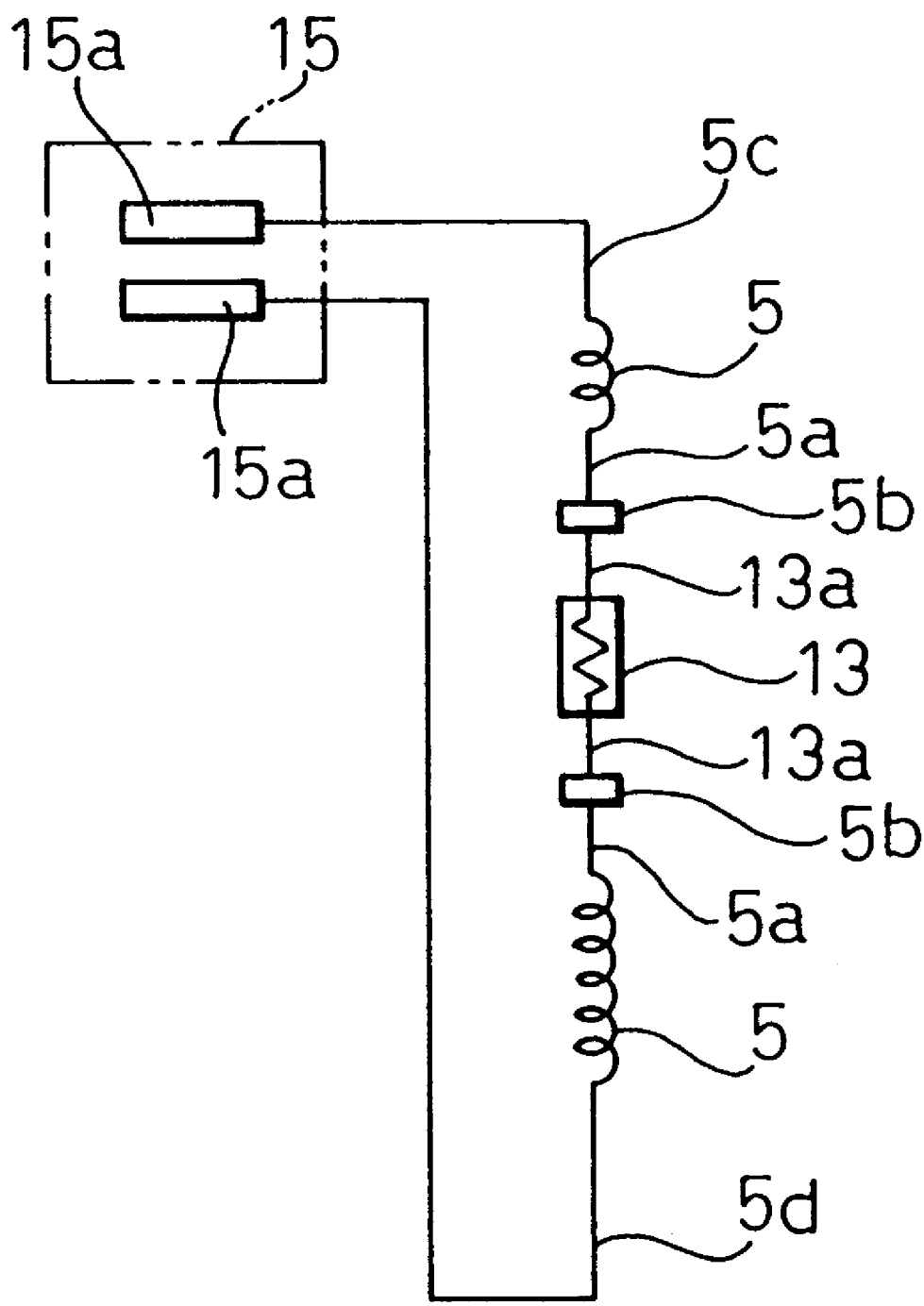
FIG. 14 is a schematic view illustrating an electric connection of the parts of the electromagnetic clutch in FIG. 1.

The ends 5c and 5d of the coil 5 are taken out by passing through holes (not shown) formed in the inner and outer tubular parts 4a and 4b of the coil housing 4 at a location designated by A in FIG. 1, the detailed structure of which is omitted for the sake of the simplicity, and are, as shown in FIG. 14, connected electrically to terminals 15a in a connector 15, which is, as shown in FIGS. 1 and 3, is arranged on the rear side of the coil housing 4 adjacent the compressor housing 100. In FIG. 14, an electrical connection of the coil 5 and the temperature fuse 13 after the completion of the assembling of the electromagnetic clutch is schematically illustrated.

As shown in FIG. 1, the temperature fuse 13 is located at a position of the coil housing 4 which is adjacent an outer wall of the inner tubular portion 4a and which is adjacent the rear end surface of the rotor 2 spaced from the frictional surface 2a of the rotor. In short, the temperature fuse 13 is embedded in the body of the resin material 6 at location adjacent the outer surface of the body of the resin material 6. In other words, the temperature fuse 6 is only covered by a thin layer of the resin material 6.

Now, a process for assembling of a stator part of an electromagnetic clutch, i.e., a process for assembling electromagnetic coil 5, the temperature fuse 13 and the coil spool 14 into the coil housing 4, which is an essential feature of the present invention, will be explained with reference to the attached drawings.

FIG. 4 and 11 show a single body of the coil spool 14 prior to the winding of the electromagnetic coil. First, the starting end of the electromagnetic coil 5 is introduced into the space inside the coil spool 14 via one of openings 14j at the coil outlet portion 14i (FIGS. 6 and 7). Then, winding of the electromagnetic coil on the tubular portion 14-3 of the coil spool 14 is commenced. After the winding of a small amount of the coil, a portion 5a of the wire is taken out from one of the cut-out portions 14g on the coil spool 14 as shown in FIG. 12. The taken out portion 5a is again introduced into the space inside the coil spool via the other cut-out portion 14g. The winding of the coil is, again, commenced in the coil spool 14. After the completion of the full winding of the coil 5 in the spool 14, the finished end of the coil 5 is taken out through the other opening 14j (see FIG. 7) at the taking out portion 14i of the spool 14. FIG. 12 illustrates the finished state of the winding of the coil 5 onto the coil spool 14.

Then, the portion 5a of the wire located outside the coil spool 14 as shown in FIG. 12 is at its center part subjected to a cutting as shown by a line M in FIG. 12, and the thus generated cut ends are bent so as to be directed oppositely in the circumference as shown in FIG. 13. Then, the temperature fuse 13 is moved toward the arc shaped holder portion 14f while the paired finger pieces 14c and 14d are resiliently widened, which finally causes the temperature fuse 13 to be snapped between the finger pieces 14c and 14d as shown in FIG. 13. In this snapped condition, a resilient force is generated in the finger pieces 14c and 14d, thereby positively holding the temperature fuse 13 in the holder portion 14f.

Then, next, the lead wires 13a at the ends of the temperature fuse 13 are connected, by means of the wire connecting members 5b, respectively, to the coil wires 5a subjected to a cutting at the previous step. FIG. 13 shows a state that the connection of the lead wires 13a of the temperature fuse 13 is completed. Thus, a mounting of the electromagnetic coil 5 and the temperature fuse 13 to the coil spool 14 is completed.

As a following step, the coil spool 14 on which the coil 5 and the temperature fuse 13 is assembled is assembled to the coil housing 4. In this case, the assembling of the coil spool 14 inside the coil housing 4 is such that the temperature fuse 13 is located adjacent the tip end of the inner tubular portion 4a of the coil housing 4 and such that the winding starting end 5c and the winding finishing end 5d of the coil 5 are taken outwardly via respective openings (not shown) in the part of the coil housing 4 intermediate between the inner and outer tubular portions 4a and 4b and the ends 5c and 5d are connected to the respective terminals 15a of the connector 15 by a suitable means, such as fusing, as schematically shown in FIG. 14.

Then, a molten resin material forming the resin member 6 is injected into the coil housing 4 and a molding is done. A solidification of the resin material causes the electromagnetic coil 5, the coil spool 14 and the temperature fuse 13 to be fixedly held in the coil housing 4 by means of the resin member 6. Simultaneously, a molding of the casing part of the connector 15 by the injected resin is done. In this case, the resin material for constructing the member 6 is, as previously stated, the one that has a relatively low molding temperature in a range between 130 to 140° C. Furthermore, the molding temperature of the resin member 6 is sufficiently lower than a thermally deformation temperature of the resin constructing the coil spool 14, so that the coil spool 14 is prevented from being subjected to deformation or degradation during the molding process of the resin material 6. As a result, an assembling of the coil spool in the coil housing 4 is thus completed.

An operation of the first embodiment of the present invention will now be explained. First, an operation during a normal operation of the compressor will be explained. During the normal operation of the compressor, an energization of the electromagnetic coil 5 causes a closed circuit magnetic flux X to be created as shown in FIG. 1, which flows from the coil housing 4 to the rotor 2 and then from the armature 8 to the rotor 2 and returns to the coil housing 4. As a result of the magnetic flux, an electromagnetic attracting force is generated between the frictional surface 2a and the armature 8, which causes the armature 8 to be moved toward and attracted to the friction surface 2a against the force of the axial resilient force of the resilient members 9. As a result, the armature 8 is rotated integrally with the rotor 2, so that the rotating movement of the armature 8 is transmitted to the hub 12 via the rivets 10, the elastic members 9 and the holding member 11. Since the rotating shaft 102 of the compressor is integrally connected to the hub 12, the rotating movement of the hub 12 is transmitted to the drive shaft 102, thereby causing the compressor to be operated for executing a compression operation on a refrigerant. It should be noted that, during the normal operation of the compressor, the resilient members 9 made of a rubber material function to absorb a variation in the torque due to the operation of the compressor.

During a normal operation of the compressor, the electromagnetic coil when it is energized generates heat. According to the present invention the temperature fuse 13 is arranged at a location adjacent the inner tubular portion 4a of the coil housing 4. Thus, the heat generated in the electromagnetic coil is mainly emitted to the coil housing 4 which is made of a ferromagnetic substance of a higher heat conductivity over the resin material. Thus, a reduction of the temperature is obtained at the location around the temperature fuse 13 in comparison with the case where the temperature fuse is located in the middle part of the resin filler 6 of a reduced heat conductivity. As a result, a possibility of an erroneous operation of the temperature fuse, i.e., an erroneous disengagement of the clutch due to the generation of the heat of the electromagnetic coil 5 is highly reduced.

On the other hand, an occurrence of a locking of the electromagnetic clutch due to an occurrence of a seizing in the compressor prevents the armature 8 in connection with the rotating shaft 102 of the compressor from being rotated, which results in a sliding movement of the rotor 2 with respect to the armature 8. As a result, an abnormally increased temperature is obtained due to the friction at the sliding portion between the armature 8 and the rotor 2. In this case, an instant increase in the temperature of the coil housing 4 is obtained at a location adjacent the end surface of the rotor 2, i.e., the tip ends of the inner and the outer tubular portions 4a and 4b due to the fact that the coil housing 4 has an increased heat conductivity over the resin material. In other words, the temperature fuse is subjected not only by the heat passed through the thin surface film of the resin material 6 but also the heat passed through the tip end of the inner tubular portion 4a of the coil housing 4, which portion 4a is located adjacent the temperature fuse. As a result, a quick response of the temperature increase in the temperature fuse is obtained in response to the increase in the temperature due to the locking of the clutch. As a result, after an occurrence of a locking in the compressor, the temperature of the temperature fuse 13 is increased, within very short time, to its opening temperature (fusing temperature), thereby de-energizing the electromagnetic clutch.

FIG. 9 shows a second embodiment of the present invention. In the first embodiment of the present invention is FIG. 8, in order to form the recess 14b for storing the temperature fuse at the inner corner of the coil spool 14, the tapered surface 14a is formed in the inner corner portion of the coil spool 14 so that the surface 14a is inclined from the transverse plane in the direction away from the frictional surface 2a of the rotor 2. In place of such the tapered surface in FIG. 8, the coil spool 14 in the second embodiment in FIG. 9 forms, at the corner between the front flange portion 14-1 and the tubular portion 14-3, a stepped portion 14k as viewed in the longitudinal crosssection as shown in FIG. 9. The stepped portion 14k the corner between the front flange portion 14-1 and the tubular portion 14-3 is stepped in the direction away from the frictional surface 2a of the rotor 2. Such a provision of the stepped portion 14k allows room to be provided for a recess 14b storing the temperature fuse at the corner portion of the coil spool 14.

FIG. 10 shows a third embodiment, where the provision of the inclined portion in the first embodiment in FIG. 8 and the provision of the stepped portion in the second embodiment in FIG. 9 are combined. Namely, in FIG. 10, at the inner corner portion between the front flange 14-1 and the tubular portion 14-3 of the coil spool 14, an inclined portion 14a and a stepped portion 14k are formed, so that the recess 14b for the storage of the temperature fuse 13 is formed.

A fourth embodiment which will be explained below is related to a modified method for the formation of the resin member 6. Namely, in the first embodiment, for the material for forming the resin member 6, a resin material is used which has a molding temperature which is sufficiently lower than the fusing temperature of the temperature fuse and the molding temperature of the coil spool 14. Contrary to this, in the fourth embodiment, as the material for forming the resin member 6, a resin material is used, of a molding temperature of, for example, 250° C. larger than the fusing temperature of the temperature fuse, such as nylon.

In this fourth embodiment, prior to the installation of the temperature fuse into the inner corner portion of the coil spool 14, an injection of the resin material into the coil housing 4 is done in order to execute the molding, so that the parts (electromagnetic coil 5 and the coil spool 14) other than the temperature fuse 13 are fixedly held to the coil housing 4 in such a manner that the molded resin is prevented from being introduced into the position at the inner corner portion of the coil spool 14 where the temperature fuse is to be arranged. Then, an installation of the temperature fuse 13 into the inner corner portion of the coil spool 14 is done, which is followed by an electrical connection of the lead wires 13a at the ends of the temperature fuse 13 to the wires 5a of the electromagnetic coil 5. Then, only at the location around the temperature fuse 13, a molding of a resin of a low molding temperature such as epoxy resin or silicone rubber is done by a conventional method, such as a potting method. In short, in the fourth embodiment, for the material for the resin member 6, a resin of a molding temperature lower than the fusing temperature of the temperature fuse 13 is used only at a portion around the temperature fuse 13, while for the remaining parts other then the location around the temperature fuse 13, a resin material of a molding temperature higher than the fusing temperature of the temperature fuse 13 is used.

In the operation of the fourth embodiment, the resin member 6 and the coil spool 14 are made from the same material, so that during the molding process of the resin member 6, the coil spool 14 is heated to the temperature adjacent the molding temperature. However, a time duration for the resin member 6 is relatively short, and thus the coil spool 14 is prevented from deformed and from degraded.

A fifth embodiment, which will be explained below, is related to a modification of the fourth embodiment as to a formation of the resin member 6. Namely, in the fifth embodiment, the temperature fuse 13 is mounted to an inner corner portion of the coil spool. After the lead wires 13a of the temperature fuse 13 are connected to the coil wire 5a of the electromagnetic coil 5, only the portion around temperature fuse 13 is molded by a resin of a low molding temperature such as epoxy resin or silicone rubber et al by a potting method. Then, a molding of the resin member 6 by a resin of a molding temperature higher than the fusing temperature of the temperature fuse 13 is done at a location other than the area around the temperature fuse.

In this embodiment, heat shielding of the location around the temperature fuse 13 is done by the low molding temperature resin. Thus, the following molding of the resin member 6 by a resin of a molding temperature higher than the fusing temperature of the temperature fuse 13 will not cause the temperature fuse 13 to be fused or opened. Furthermore, once the epoxy resin or silicone rubber constructing the portion around the temperature fuse 13 is molded or solidified, the molded is prevented from being softened with a short duration of time even if the portion is heated to a temperature higher than the molding temperature.

While the present invention is described by the above embodiments related to a compressor for a refrigerant in an air conditioning device for a vehicle, the present invention is not limited to this application.

We claim:

1. An electromagnetic clutch for selective connection of a rotating movement source with a rotary device, said electromagnetic clutch comprising:

a first rotating member made of a magnetic substance and connected to said rotating movement source so that the first rotating member is rotated thereby;

a second rotating member connected to said rotary device for transmission of the rotating movement thereto;

an electromagnetic coil for generating an electromagnetic attracting force when said electromagnetic coil is energized;

a coil housing made of a magnetic substance for storing therein said electromagnetic coil;

an armature made of a magnetic substance;

said first rotating member having a frictional engagement surface which faces the armature so that said electromagnetic attracting force of the electromagnetic coil causes the armature to be attracted to the frictional engaging surface of the first rotating member;

an elastic connection means arranged between said armature and the second rotating member for holding said armature at a location spaced from the frictional engaging surface of the first rotating member when said electromagnetic coil is de-energized;

a temperature fuse arranged in the coil housing at a location adjacent the frictional engaging surface of the first rotating member, said temperature fuse being fused at a temperature higher than a predetermined value, thereby to de-energize said electromagnetic coil; and a coil spool of a tubular shape arranged in said coil housing, said electromagnetic coil being located on the coil spool, said coil spool having an axial end wall adjacent the frictional surface of the first rotating member and extending substantially circumferentially said coil housing;

said coil spool containing, at a location adjacent the frictional surface of the first rotating member, a recess where said temperature fuse is arranged, said recess being recessed in an axial direction relative to said axial end wall of said coil spool, at least a portion of said temperature fuse being disposed in said recess.

2. An electromagnetic clutch according to claim 1, wherein said recess in the coil spool is located in a radially inner corner portion of the coil spool.

3. An electromagnetic clutch according to claim 2, wherein said coil spool is, at a radially inner corner thereof, formed with an inclined surface which is inclined in a direction axially away from the frictional engaging surface of the first rotating member, said recess being accommodated by said inclined surface.

4. An electromagnetic clutch according to claim 2, wherein said coil spool is, at a radially inner corner thereof, formed with an stepped surface which is directed axially away from the frictional engaging surface of the first rotating member, said recess being accommodated by said stepped surface.

5. An electromagnetic clutch according to claim 2, wherein said coil spool is, at the inner corner, formed with an inclined surface which is away from the frictional engaging surface of the first rotating member and a stepped surface which is in a continuation of the inclined surface, so that said recess is accommodated by said inclined surface as well as by said stepped surface.

6. An electromagnetic clutch according to claim 1, wherein said coil spool is formed from a resilient resin material, and said coil spool is integrally formed with fingers for resiliently holding the temperature fuse at a radially corner portion of the coil spool.

7. An electromagnetic clutch according to claim 1, wherein said coil spool is, at locations adjacent to both sides of the temperature fuse, formed with cut-out portions for taking out cut ends the electromagnetic coil, said cut ends of the wire being for electrical connection with corresponding ends of the temperature fuse.

8. An electromagnetic clutch according to claim 1, wherein said coil housing is formed as a double tube structure having inner tubular and outer tubular portions, said inner tubular portion of the coil housing being, at a tip end adjacent the frictional surface, 2$a$ of the first rotating member, formed with an inclined surface which is inclined from an outer side to an inner side, and wherein said recess for storage of the temperature fuse is arranged along said inclined surface of the inner tubular portion of the coil housing.

9. An electromagnetic clutch according to claim 1, wherein it further comprises a molding member molded in the coil housing in such a manner that said coil spool and the temperature fuse are fixedly held in the coil housing by said molding member.

\* \* \* \* \*